Patented Mar. 28, 1950

2,502,198

UNITED STATES PATENT OFFICE 2,502,198

BALL MILL LINING ELEMENT AND COMPOSITION FOR SAME

Raymond C. Benner and John Charles McMullen, Niagara Falls, N. Y., assignors to The Carborundum Company, Niagara Falls, N. Y., a corporation of Delaware No Drawing. Application August 28, 1942, Serial No. 456,576

7 Claims. (Cl. 241—182)

This invention relates to ceramic abrasion-resistant materials.

The object of the invention is to provide a cast material of great hardness and wear resistance for use particularly as the wearing elements of ball mills. In the case of the larger ball mills such wearing elements are applied to the mill in the form of lining elements. With small or "jar" ball mills the complete container or jar may be made of the material of the present invention.

In ball mills, the material to be finely ground is placed in a container with grinding pebbles or balls, and the container revolved for a considerable length of time. The material is finely comminuted by the action of the balls, which cascade down the rising side of the container, grinding the material between them and between them and the container lining. The wear on both the grinding balls and the ball mill lining is very severe, and consequently the materials used for them must be highly resistant to abrasion. Such materials must also be tough and highly resistant to chipping upon impact.

Porcelain mill liners, which are conventionally used, leave much to be desired as to their wearing qualities. The porcelain consists of a fired mixture of finely ground silica, feldspar, and clay or clays, which may contain small percentages of auxiliary fluxes such as talc or limestone. Since porcelain consists of bonded particles or granules, it is subject to the breaking out of particles by disruption of the bond between them as a result of the abrasive impact of the pebbles and the charge. With the porcelain lining elements of ordinary thickness a grinding life of 500 hours when the mill is wet grinding alumina powder is considered good. The material of the present invention, however, when used as ball mill linings wears at a rate less than one seventh as fast as porcelain when grinding the same material. In addition its cost of manufacture is not high, and being free from voids, it retains its usefulness even when worn down a material amount of its initial thickness.

Ball mill linings of the present invention consist of extremely hard solid cast masses of crystalline alumina containing a minor percentage of glass. Since the lining material is fused and cast, as distinguished from being bonded and sintered, it is highly resistant to chipping. Its surfaces are dense, unyielding, and impermeable, thus providing an ideal surface for the grinding pebbles to work against and one easy to clean when changing the mill from a batch of material of one type to that of another type. Because the lining consists predominantly of alumina, it is particularly suitable for grinding alumina since the material worn off the lining does not differ materially from the alumina being ground.

When it is attempted to make lining elements cast from a fusion of 100% alumina or from any of the ores high in alumina, as for example bauxite, gibbsite, diaspore, emery, corundum, or laterite, they crack on annealing and are thus of no value. It has been found that the addition of glass to alumina and to aluminous ores in amounts less than 2% does not eliminate this fatal difficulty. When, however, glass in the amount of 2% or over, up to and including 15%, is added to the aluminous material and the mixture fused and cast into the desired shape the product is free from cracks, is hard and tough, and is free from holes.

When the glass content in the aluminous material-glass mixture is increased beyond 15% the resulting cast product lacks "workability." That is, the casting cracks when self-annealed in a heat insulating powder or very slowly in an oven, and shows shucking off of the corners. The wear resistance of such fused cast product even if it could be made without cracks is too low to display any marked advantages over porcelain.

Broadly, the fused cast products falling within the present invention consist of a predominant amount of $Al_2O_3$, as such, with smaller amounts of other oxides derived from the aluminous starting material and from the 2–15% glass employed in the fusion. The $Al_2O_3$ content of products within this invention lies between approximately 54 and 98%.

As specific examples, given for illustrative purposes only, the following mixtures for making fused cast ball mill lining elements falling within the present invention are given:

Example I

Calcined Arkansas bauxite, whose components lie within the following ranges, is employed:

| | Percent |
|---|---|
| $TiO_2$ | 3–4 |
| $SiO_2$ | 7–11 |
| $Fe_2O_3$ | 6–16 |
| $Al_2O_3$ | Balance |

To the comminuted bauxite is added crushed soda-lime glass whose components lie within the following range:

| | Percent |
|---|---|
| CaO | 5–11 |
| $Na_2O$ | 9–20 |
| $SiO_2$ | 69–75 |
| Other metal oxides (the metals consisting predominantly of Fe, Al, Mg, Mn, and Ba) | 1– 8.15 |

The glass composes, as indicated above from 2 to 15% by weight of the bauxite-glass mixture.

The composition of the resulting bauxite-soda-lime glass mixture therefore lies within the following limits:

| | Per cent |
|---|---|
| $SiO_2$ | 7.97–20.55 |
| $CaO$ | 0.10– 1.65 |
| $Na_2O$ | 0.18– 3.00 |
| $TiO_2$ | 2.94– 3.40 |
| $Fe_2O_3$ | 5.88–13.60 |
| Other metal oxides (the metals consisting predominantly of Mg, Mn, Ba, etc.) | .02– 1.28 |
| $Al_2O_3$ | Balance |

Example II

Borosilicate types of glass in the same amounts may be employed in the mixture instead of the soda-lime glass described above. To the comminuted bauxite is added, in this alternative procedure, crushed borosilicate glass whose components lie within the following range:

| | Per cent |
|---|---|
| $B_2O_3$ | 10–20 |
| $Na_2O$ | 10–20 |
| $SiO_2$ | 60–80 |
| Other metal oxides (the metals consisting predominantly of Fe, Al, Mg, and Ba) | 1– 7.5 |

The borosilicate glass composes, as indicated above, from 2 to 15% by weight of bauxite-glass mixture.

The composition of the resulting bauxite-glass mixture therefore lies with the following limits:

| | Per cent |
|---|---|
| $SiO_2$ | 8.05–21.35 |
| $Na_2O$ | .20– 3.00 |
| $B_2O_3$ | .20– 3.00 |
| $TiO_2$ | 2.94– 3.40 |
| $Fe_2O_3$ | 5.88–13.60 |
| Other metal oxides (the metals consisting predominantly of Mg, Mn, and Ba) | .02– 1.125 |
| Balance $Al_2O_3$. | |

Example III

Low expansion glasses such as the borosilicate glass known by the trade-name "Pyrex" may be used in the aluminous material-glass mixture instead of the glasses given in Examples I and II. A typical glass of this type analyzes:

| | Per cent |
|---|---|
| $SiO_2$ | 80.75 |
| $Al_2O_3+Fe_2O_3$ | 2.20 |
| $CaO$ | .30 |
| $Na_2O$ | 4.1 |
| $K_2O$ | .10 |
| $B_2O_3$ | 12.00 |

Such glass may be added to aluminous material such as gibbsite, the glass constituting from 2 to 15% by weight of the mixture.

A typical calcined gibbsite which may be employed in the mixture analyzes:

| | Per cent |
|---|---|
| $Al_2O_3$ | 94.10 |
| $SiO_2$ | 4.20 |
| $Fe_2O_3$ | .66 |
| $MgO$ | .05 |
| $TiO_2$ | .62 |
| $CaO$ | .32 |

The composition of the resulting gibbsite-glass mixture in this particular instance is as follows:

| | Per cent |
|---|---|
| $Al_2O_3$ | 79.92–92.17 |
| $SiO_2$ | 5.18–16.22 |
| $Fe_2O_3$ | .58– .81 |
| $Na_2O$ | .08– .62 |
| $B_2O_3$ | .24– 1.80 |
| $TiO_2$ | .53– .61 |
| $K_2O$ and $MgO$, traces. | |

The source of alumina is not confined to bauxite or gibbsite, as set out in the above three examples; it may be diaspore, laterite, corundum, or emery. Furthermore, pure alumina may be employed wholly or partially in the aluminous material-glass mixture.

Example IV

Pure alumina was employed with the same soda-lime glass used in Example I, the glass composing from 2 to 15% of the mixture. The composition of the resulting alumina-glass mixture is thus as follows:

| | Per cent |
|---|---|
| $Al_2O_3$ | 85 –98 |
| $CaO$ | 0.10– 1.65 |
| $Na_2O$ | 0.18– 3.00 |
| $SiO_2$ | 1.38–11.2 |
| Other metal oxides (the metals consisting predominantly of Fe, Mg, Mn, Ba, etc.) | .02– 1.28 |

The aluminous material-glass mixture may be fused in various ways, a convenient method is to employ an electric furnace of the submerged arc type such as that shown and described in United States Patent No. 929,517, to F. J. Tone. The operation of the furnace is similar to that followed in the production of synthetic alumina abrasives.

The furnace consists of a water cooled iron shell having no other lining than that built up by the material being fused as it is fed into the furnace. Fusion is effected initially by the heat from the carbon arc between two or more carbon or graphite electrodes inserted in the iron shell, but after a bath of molten material is formed, the resistance of this material to the passage of electric current is used to supply heat. The material is gradually fed in and the electrodes raised as the fused mass is built up.

When the material has arrived at the proper temperature and the correct degree of fluidity, the casting is made by pouring the molten material into molds of the desired shape and size. The furnace may be adapted either for tapping the molten material out through its side or for tilting so as to pour over a lip. The molds may be of granular refractory material bonded with a core binder such as is commonly used in foundry practice, or may be made of slabs of preburned refractory, or of a suitable metal, or of graphite. The molded articles should be of the proper shape to form a section of the pebble mill lining, and the size should be as large as is convenient for a bricklayer to handle in lining the mill.

If desired, the molds may be preheated, and may be insulated to prevent too rapid loss of heat by embedding them in a molding flask in which they are surrounded by sand or other heat insulating material. The molds should be provided with risers of ample size to permit complete filling of the mold without interference by material freezing in the headers. Moreover, the headers should be of sufficient size to allow for the contraction of the molten material as it solidifies in the molds. If the riser is made wedge-shaped with its minimum section immediately adjoining the molds, removal of the excess material constituting a header is facilitated. After a mold is filled, it is moved away and additional molds filled successively.

The molded sections may be left in the mold for heat treatment or may be taken from the molds shortly after the outer walls of the casting have solidified. They are then carefully cooled by any of the methods well-known in the art; and after they are cool any objectionable remainder of the header or other minor roughness is removed by chipping or grinding.

This method of casting forms no part of the present invention, but is recited to complete the disclosure of the invention and to explain what is meant by the term "cast" in this specification and in the claims. When cast blocks, cast lining elements and the like are here spoken of, it is to be understood that they are cast from a molten mass.

The blocks, after being cast and dressed, are laid in the form of a lining in the shell of the pebble mill, using as small an amount of cementing material to hold them in place as practicable, and are thereafter ready for immediate service.

On examination of a fractured surface of the fused cast material of the present invention it is found that the structure is dense and that the fracture-crystals are hackly to almost conchoidal. The material at each face of the cast block or segment and for a material distance inwardly from the face is in the form of elongated crystals with the major axis approximately perpendicular to the face. Examination of a thin section of such material reveals that the microstructure consists of areas containing interlocking oriented skeletal alpha alumina crystals with their interstices filled with an opaque ground mass. The skeletal crystals are arranged in thin columns whose direction is that of the C axis of corundum crystals. Many of the alumina skeletal crystals are bounded with opaque needle-like crystals of rutile. In some cases the columns are roughly parallel, in others there is an interweaving giving almost a fibre structure. The general structure may be described as "feather-like."

It has been found that the addition of soda, $Na_2O$, as such, alone to the aluminous material in an amount equal to that contained in the soda-lime glass addition of 2–15%, that is, from .18–3.00% $Na_2O$, does not yield a commercially usable product. Whereas the mechanical strength of the cast products resulting from such addition of $Na_2O$ alone is satisfactory, and the hardness is also good, the product contains numerous holes, mainly at or near its surfaces. After a short period of use as a lining element the surface becomes rough and pitted, tends to break off and wear more rapidly, and thus is unsuitable.

It has also been found that the addition of lime, CaO, as such, alone to the aluminous material in an amount equal to that contained in the soda-lime glass addition of 2–15%, that is, .10–1.65 CaO, does not yield a commercially usable product. The cast product obtained by such addition of lime alone appears similar to that described above as resulting from the addition of soda alone. Whereas mechanical strength and hardness of the product resulting from the addition of lime alone are good, the product contains numerous holes near its surfaces.

The same defects are present in the fused cast product resulting from the addition of both $Na_2O$ as such within the limits .10–1.65% to aluminous material, and fusing and casting the mixture. This product is likewise of good mechanical strength and hardness, but contains numerous voids, especially near its surfaces. The same is true of the product when $B_2O_3$ alone is added to the aluminous material in an amount equal to that contained in the borosilicate glass used in Example II, namely, from .20 to 3.00%, when from .20 to 3.00% $B_2O_3$ and from .20 to 3.00% $Na_2O$ are added to the aluminous material, and when from .24 to 1.80% $B_2O_3$ and from .08 to .62% $Na_2O$ are added singly or together to the gibbsite of Example III.

It is believed that the voids resulting from the introduction of $B_2O_3$, CaO, or $Na_2O$ into the aluminous material to be fused occur as a result of gas generated by a reaction between the $B_2O_3$, CaO, or $Na_2O$ and the aluminous material, or as a result of fusion of the $B_2O_3$, CaO, or $Na_2O$. On the other hand, the CaO and $Na_2O$ have already been fused, with silica, in the formation of soda-lime glass, $B_2O_3$ and $Na_2O$ have already been added in the formation of borosilicate glass; the addition of them within the limits specified to aluminous material when they are incorporated as ingredients in glass appears to give rise to no evolution of gas additional to that given off by the fusion of the aluminous material by itself. The fused cast product resulting from the addition of glass to aluminous material has few if any voids therein, and such few extremely small voids that occasionally do occur therein are usually well in the interior of the casting. Castings made in accordance with the present invention possess the properties, as has been pointed out above, of good mechanical strength and hardness, in addition to substantial freedom from voids and the ability to be cooled down from casting temperature and annealed without developing cracks.

Wear tests conducted on the fused cast material of the present invention demonstrate the material advantage to be derived from its use as ball mill lining elements. In a ball mill of commercial size ten fused mill lining segments containing 95% bauxite and 5% soda-lime glass, falling within the type of soda-lime glass above set out as useful within the scope of this invention, were installed. Segments of other compositions tested at the same time completed the mill lining. Among the segments made of such other compositions were segments of a high grade porcelain, which is conventionally employed as a ball mill lining. The segments of each different mix or composition were staggered in the mill to give uniform distribution to each mix in the mill.

The mill employed was equipped with a continuous axle, thus allowing measurements to be taken from the axle to the exposed face of the segment. The mill was run for 334 hours with a charge of wet alumina powder, designated "K5 Aloxite," employing natural flint pebbles or balls as the grinding medium. The following table gives the results of such test:

| Material | Wear in in. after 334 Hr. wet grinding of K5 Aloxite | Ratio of wear resistance to porcelain |
|---|---|---|
| High grade porcelain | 0.538 | 1.0 |
| Fused cast mixture of 95% bauxite-Arkansas, 5% soda-lime glass | 0.134 | 4.0 |

A mill employed in regular production wet grinding of alumina powder was completely lined with fused cast lining blocks 2½ inches thick and containing 90% Arkansas bauxite and 10% soda-lime glass of a type falling within the limits heretofore defined. After 1110 hours of such grinding, employing flint grinding pebbles as the grinding medium, the wear in lining thickness amounted to 0.67 inch.

Linings of the same thickness, but made of high grade porcelain, have been regularly employed in ball mills of the same size for grinding the same material under identical conditions. Such porcelain linings have been considered as giving good service if they lasted from 500 to 600 hours before completely wearing out. It can thus be seen that in a comparable period of time the lining of the present invention wore less than 1/7 of their original thickness.

These results demonstrate strikingly the advantage to be derived from the use of the material of the present invention as a ball mill lining. Whereas the specific mixture 95% bauxite-5% soda-lime glass was employed in the test and the mixture 90% bauxite-10% soda-lime glass was employed in the mill for production grinding, it is to be understood that the present invention is not confined to such specific examples but lies within the limits before set out.

An accurate test as to whether or not a material is suitable for use as a ball mill lining is furnished by the sand blast penetration test. Such test subjects a specimen under fixed conditions of air pressure, jet size, distance of specimen surface from the jet, type and amount of abrasive particles, and length of time that the specimen is subjected to the blast, to the action of abrasive particles borne by air under high pressure against the specimen. The depth of penetration into the specimen is an accurate test of its hardness and resistance to abrasion, both of which are required to be high in satisfactory ball mill linings.

The following table gives the results of sand blast penetration tests conducted on the same kind of high grade porcelain lining elements employed in the ball mill test, above, and various lining segments made of compositions within the scope of the present invention. All specimens of aluminous material glass mixtures given below were fused and cast.

| Material | Sand blast penetration test-penetration in inches | Ratio of resistance to sand blast to that of porcelain |
|---|---|---|
| High grade porcelain | 0.0270 | 1 |
| 1. 98% bauxite, 2% soda-lime glass | 0.0070 | 3.9 |
| 2. 98% bauxite, 2% "Pyrex" glass | .004 | 6.75 |
| 3. 95% bauxite, 5% soda-lime glass | 0.0050 | 5.4 |
| 4. 95% alumina, 5% soda-lime glass | .001 | 27 |
| 5. 95% bauxite 5% "Pyrex" glass | .005 | 5.4 |
| 6. 90% bauxite, 10% soda-lime glass | 0.0072 | 3.7 |
| 7. 90% bauxite, 10% borosilicate glass | 0.0075 | 3.6 |
| 8. 90% alumina, 10% soda-lime glass | .002 | 13.5 |
| 9. 85% bauxite, 15% soda-lime glass | 0.0090 | 3.0 |

It is thus apparent that all compositions within the range limits disclosed in the present invention display marked advantages as to increased wear resistance over porcelain, which is considered satisfactory by the art for use as ball mill linings. Use of the material of the present invention, the ingredients of which are cheap, readily available, and economically processed to form the fused cast product, for such purpose results in material savings in cost due to its increased length of life in service.

As has been stated previously, the material of the present invention is not limited to use as ball mill lining elements. In the case of the smaller or "jar" ball mills the entire container or jar may be made by casting. Such "jar" mill made of the material of the present invention exhibits the same desirable properties as do the lining elements for the larger ball mills, that is, they are hard, tough, and extremely resistant to the wear imposed on them during grinding. The "jar" mill container may be made, for example, by the method set out in the Benner et al. patent, No. 2,164,635, for the casting of hollow refractory shapes.

It is believed that the great length of life of the ball mill lining of the present invention is due in part at least to the fact that a major portion of the crystals lie with their major axes perpendicular to the wearing surface of the blocks. Hence as the working face becomes eroded away there is continuously presented a working face of the same character as possessed by the block in its initial condition.

Having thus fully disclosed the invention, we claim:

1. A wearing portion for a ball mill comprising a dense, hard, wear-resistant fused casting, said casting compriisng $SiO_2$ from 8.05 to 21.35%, $Na_2O$ from .20 to 3.00%, $B_2O_3$ from .20 to 3.00%, $TiO_2$ from 2.94 to 3.40%, $Fe_2O_3$ from 5.88 to 13.60% and other metal oxides from .02 to 1.125%, said last named metals consisting predominantly of Mg, Mn, and Ba, the balance of the composition being alumina.

2. A ball mill having a lining element comprising a dense, hard, wear-resistant, fused casting substantially free from voids and cracks, said casting comprising crystalline $Al_2O_3$, as such, in amounts from approximately 54% to 98% and a glassy matrix.

3. A ball mill having a lining element comprising a dense, hard, wear-resistant, fused casting substantially free from voids and cracks, said casting comprising crystalline $Al_2O_3$, as such, in amounts from approximately 54% to 98% and a glassy matrix, said element having a wear resistance, when exposed to penetration by a sand blast, at least three times as great as the wear resistance of high grade porcelain lining elements when exposed to a sand blast of the same intensity.

4. A ball mill having a lining element comprising a dense, hard, wear-resistant, fused casting substantially free from voids and cracks, said casting comprising crystalline $Al_2O_3$, as such, in amounts from approximately 54% to 98% and a glassy matrix, said $Al_2O_3$ being in the form of elongated crystals with the majority of the crystals having their major axes oriented perpendicular to the wearing surface of the element.

5. A ball mill having a lining element comprising a dense, hard, wear-resistant, fused casting substantially free from voids and cracks, said casting comprising 85% to 98% crystalline alumina, as such, and 2 to 15% glass.

6. A ball mill having a lining element comprising a dense, hard, wear-resistant, fused casting substantially free from voids and cracks, said casting comprising 85% to 98% crystalline alumina, as such, and 2 to 15% glass, said element having a wear resistance, when exposed to penetration by a sand blast, at least three times as great as the wear resistance of high grade porcelain lining elements when exposed to a sand blast of the same intensity.

7. A ball mill having a lining element comprising a dense, hard, wear-resistant, fused casting substantially free from voids and cracks, said casting comprising 85% to 98% crystalline $Al_2O_3$, as such, and 2 to 15% glass, said $Al_2O_3$ being in the form of elongated crystals with the majority of the crystals having their major axes oriented perpendicular to the wearing surface of the element.

RAYMOND C. BENNER.
JOHN CHARLES McMULLEN.

REFERENCES CITED

The following references are of record in the file of this patent:

UNITED STATES PATENTS

| Number | Name | Date |
|---|---|---|
| 44,973 | Rands | Nov. 8, 1864 |
| 227,498 | Davis | May 11, 1880 |
| 954,766 | Saunders | Apr. 12, 1910 |
| 1,199,042 | Allen | Sept. 26, 1916 |
| 1,966,406 | Hauman | July 10, 1934 |
| 1,966,407 | Hauman | July 10, 1934 |
| 1,966,408 | Hauman | July 10, 1934 |
| 2,040,051 | Klinger | May 5, 1936 |
| 2,044,817 | Schroeder | June 23, 1936 |
| 2,079,101 | Benner et al. | May 4, 1937 |
| 2,154,153 | Easter et al. | Apr. 11, 1939 |
| 2,154,318 | Benner et al. | Apr. 11, 1939 |
| 2,195,950 | Wood | Apr. 2, 1940 |
| 2,196,075 | Logan et al. | Apr. 2, 1940 |

FOREIGN PATENTS

| Number | Country | Date |
|---|---|---|
| 497,253 | Great Britain | Dec. 15, 1938 |

OTHER REFERENCES

Searle, Refractory Materials, 2nd edition, 1924, page 174.